United States Patent Office 3,403,037
Patented Sept. 24, 1968

3,403,037
FOUNDRY CORE AND MOLDING SAND COMPOSITION
Jack C. Cowan, Augustus Earl Beasley, Jr., and Hugh G. Gainey, Houston, Tex., assignors to National Lead Company, New York, N.Y., a corporation of New Jersey
No Drawing. Filed Jan. 19, 1966, Ser. No. 521,511
9 Claims. (Cl. 106—38.6)

ABSTRACT OF THE DISCLOSURE

The invention provides a novel molding and core sand composition for the casting of metals, comprising sand as a major ingredient, and a binder for the sand consisting of a long-chain alkyl ammonium lignosulfonate in an organic liquid such as diesel oil, higher aliphatic alcohols, and the like, with an optional inclusion of organophilic montmorillonite or organophilic attapulgite or mixtures thereof. The inventive sand mixtures give high green strengths and good baked core strengths, so that they are useful both as molds and as cores.

---

This invention relates to molding and core compositions comprising sand as a major constituent such as are used for the casting of metals, and more particularly, to an improvement in the type thereof wherein bonding is accomplished with materials other than ordinary clay as such and liquids other than water.

As is well known, in the sand casting of metals a molten metal is poured into a mold forming from a suitable comminuted temperature-resistant mineral, commonly known as sand, and indeed, generally consisting of quartz sand, which is bonded by the use of a relatively minor amount of suitable bonding agent, which most commonly has been clay tempered with some water.

Apertures in metal castings are provided in part by portions of the sand mold itself; and in part they are provided by inserts known as cores, which again are made up of sand as a major constituent, generally some clay and water, and various adhesive materials which may include starch, starch-gluten mixtures, waste sulfite liquor, drying oils such as linseed and soya oils, and the like.

In recent years, it has been realized that sand-clay systems of this relatively simple type are not ideally suited to all types of casting, and especially as metal founding technology becomes more and more complex, quite different systems have been developed for sand molds.

An important recent development consists in the utilization of an organophilic clay, using a material such as a petroleum oil to produce the bond. Non-aqueous systems of this type are described, for example, in Canadian Patent 572,142 and United States Patent 3,027,265. Even such systems fall short of perfection, however, and the present invention is concerned with improvements in essentially non-aqueous molding sand compositions of this general type, as well as in core sand compositions.

An object of the present invention is to provide a bonded sand composition useable both as a molding sand and as a core sand, containing a completely organic bonding agent including an organic liquid.

Another object of the invention is to provide compositions of the type described containing such an organic bonding agent together with an organophilic clay, likewise including an organic liquid.

Other objects of the invention will become apparent as the description thereof proceeds.

It may be stated that our inventive compositions are unusual in that one and the same composition may be used alike as a molding sand, as the term is ordinarily understood; and also as a core sand, as this term is generally understood. If desired, slight variations may be made in components, relative concentrations and the like so as to make some of the compositions better suited for molding sands and others better suited for core sands. In general, however, we draw no hard and fast distinction between the two in the present disclosure and in the claims which follow, because of the essential identity of our compositions whether used for one or for the other purpose.

Generally speaking and in accordance with an illustrative embodiment of our invention, we combine, so as to form a molding sand mix: a foundry sand; and a binder which consists of a mixture of a suitable organic liquid as hereinafter described in greater detail, among which may be, for example, diesel oil or nonyl phenol or a mixture of the two, together with a long-chain alkyl ammonium lignosulfonate and which may be conjoined with an organophilic clay in any proportion from 0 to 4 parts of the organophilic clay for each part of the long-chain alkyl ammonium lignosulfonate. While it is not necessary for the practice of the invention, other additives common in the non-aqueous molding sand art may also be present, such as, for example, silica flour, finely divided iron oxide, and the like. Also, as set forth in greater detail hereinbelow, the organic liquid need not be a single chemical species but may be a mixture of several.

Those skilled in the art are well acquainted with foundry sands generally, and consequently these need not be described in any great detail herein save to state that those molding sands commonly used in the conventional claybonded sand molds are likewise well suited for use in our invention. These are generally quartz sand, the particle size of which may be varied over a wide range, which by way of illustration and not limitation may be, for example, from about 40 to about 175 grain fineness number (GFN) as determined by the standard methods of the American Foundrymen's Society. Olivine sand is often used because of its freedom from silicosis hazard; and zircon sand may be used especially for very high temperature casting.

The long-chain alkyl ammonium lignosulfonates are salts of lignosulfonic acid, which is widely available in various commercial forms, for example as a by-product of the sulfite process of pulp manufacture or from the sulfonation of lignin derived by other processes of pulp manufacture; and generally furnished as the sodium, calcium, or ammonium salt.

In order to make an alkyl ammonium lignosulfonate for use in our invention, we simply replace by metathesis the sodium, calcium, or ammonium ion present in the starting lignosulfonate material with an alkyl ammonium ion, the latter possessing a hydrocarbon chain of between 12 and 22 carbon atoms in a straight chain. Since these alkyl ammonium lignosulfonates are not soluble in water, their production is quite simple. Thus, we may, for example, add an aqueous solution of an alkyl ammonium salt, e.g., octadecyl ammonium chloride, to an aqueous solution of a lignosulfonate, e.g., sodium lignosulfonate, whereupon the octadecyl ammonium lignosulfonate will be precipitated leaving the metathetical sodium chloride in solution. The alkyl ammonium lignosulfonate may be recovered by filtration followed by drying and grinding, or its recovery may be accomplished by the so-called flushing technique, which involves the addition of some oily substance such as, for example, diesel oil, to the reaction mixture just described, whereupon the alkyl ammonium lignosulfonate collects in the oily layer or phase and may be readily separated.

By the term "alkyl ammonium . . . having a hydrocarbon chain of between 12 and 22 carbon atoms in a straight chain," we mean to include any substituted ammonium ion in which at least one long carbon chain is present, including not only substituted ammonium strictly speaking, but also substituted polyamines, such as diethylene triamine, tetraethylene pentamine, and the like; and heterocyclic nitrogen bases, such as pyridinium, imidazolinium, morpholinium, and the like.

Thus, the long hydrocarbon chains having between 12 and 22 carbon atoms may be chosen from the following— the listings which follow being illustrative and not exhaustive:

LIST A lauryl (n-$C_{12}H_{25}$) (dodecyl)
myristyl (n-$C_{14}H_{29}$) (tetradecyl)
cetyl (n-$C_{16}H_{33}$) (hexadecyl)
margaryl (n-$C_{17}H_{35}$) (heptadecyl)
stearyl (n-$C_{18}H_{37}$) (octadecyl)
arachidyl (n-$C_{20}H_{41}$) (eiosyl)
behenyl (n-$C_{22}H_{45}$) (docosyl)
oleyl (n-$C_{18}H_{35}$)
arachidonyl (n-$C_{20}H_{39}$)
2-ethyloctadecyl ($C_{20}H_{41}$)

Similarly, the alkyl ammonium ions may be selected from the following list, in which "R" is meant to indicate a longchain alkyl of the type which may be selected from the list just given hereinabove.

LIST B $RNH_3^+$
$R_2NH_2^+$
$R_3NH^+$
$RCH_3NH_2^+$
$R_2(CH_3)_2N^+$
$RC_6H_5(CH_3)_2N^+$
$R_2C_6H_5C_2H_5N^+$
$R(CH_3)_2N^+C_2H_4N^+(CH_3)_2R$

We prefer to produce an alkyl ammonium lignosulfonate by metathesis such that the alkyl ammonium ion present is substantially an equivalent of the lignosulfonate ion present. The base-combining capacity of the lignosulfonate starting material, i.e., its equivalent weight, may be readily determined by standard simple chemical methods and, in general, will be available from the manufacturer or purveyor thereof. The corresponding equivalent weight of the alkyl ammonium material may likewise be readily determined and generally will be available from the manufacturer.

By our description of the formation of the alkyl ammonium lignosulfonate by metathesis, we naturally do not mean to exclude its production by neutralization of the free organic base with the free lignosulfonic acid. Thus, for example, octadecylamine may be caused to react directly with lignosulfonic acid. In general, this is not quite as convenient to carry out as precipitation by adding the respective salts, since the use of a non-aqueous solvent, such as acetone or diethylene glycol, is often necessary in order to obtain complete reaction.

The organophilic clay which we may use in our invention is chosen from the group which consists of organophilic montmorillonite and organophilic attapulgite and indeed mixtures thereof in any proportion. Such organophilic clays are now a well-known article of commerce, and they are described in extensive technical and patent literature. In general, organophilic clays are made by starting with a clay of substantial base exchange capacity, the most commonly used of which are montmorillonite as represented, for example, by Wyoming bentonite or by hectorite, and attapulgite, and effecting a cation exchange by replacing the bases present in the clay, which may be, for example, sodium, calcium, hydrogen, and the like, with a long-chain onium cation, which, indeed, is most often a long-chain alkyl ammonium ion, and may be chosen from the same class already described hereinabove in connection with the alkyl ammonium lignosulfonate. Organophilic clays are described in Hauser Patent 2,531,-427; Jordan Patent 2,531,440; Miericke Patent 3,027,265; and Canadian Patent 572,142; and, indeed, many others. They are also described in the book "Clay Mineralogy" by Ralph E. Grim, New York: 1953; and in the book entitled "The Colloid Chemistry of Silica and Silicates" by Ralph K. Iler, Ithaca: 1955, pages 225–226. Organophilic clays are commercially available under the trademark "Bentone." In general, the organophilic clays commercially available and useful in our invention have within narrow limits the exact amount of long-chain onium ion reacted with the clay which corresponds to the cation exchange capacity of the latter. Organophilic clays are generally produced and are commercially available in the form of a fine, dry powder, generally about 200 mesh.

The organophilic liquid which we use may be selected from a large group, which includes paraffin oils from kerosene through fuel oil, diesel oil, light and heavy lubricating oils, and petrolatum; liquid aliphatic alcohols from 6 carbon atoms upwards; liquid alkyl phenols in which the alkyl group is butyl or larger, and including, particularly, nonyl phenol; the polyethylene glycols commercially available, for example, under the trademark "Carbowax" and having average molecular weights of about 200 to 400; the analogous polyethylene glycols which have molecular weights of about 150 to 1,000; phosphate esters of ethoxylated alkyl phenols as described in United States Patent 3,004,056; and a wide variety of other comparable organic liquids; and mixtures of any or all of these. We prefer and find best a mixture of about 90% diesel oil and 10% nonyl phenol.

The relative proportions of the ingredients may be varied within broad limits. For each 100 parts of sand, by weight, we use from 2 parts to 10 parts of the alkyl ammonium lignosulfonates (said alkyl having from 12 to 22 carbon atoms in a straight chain) and from zero to 4 parts of organophilic clay (and more particularly, organophilic montmorillonite, organophilic attapulgite, and mixtures thereof), for each part by weight of the aforesaid alkyl ammonium lignosulfonates. The organic liquid is used in amounts sufficient to impart to the mold and core sand composition a green compressive strength of at least two pounds per square inch. Broadly speaking, the amont of organic liquid will be found to vary from about 1/10 to about 1½ parts by weight for each part of the aforesaid alkyl ammonium lignosulfonate plus organophilic clay.

The several ingredients are mixed together by means well known in the foundry art, as to produce a homogeneous mixture; and the testing for the various properties including compressive strength may be accomplished, again, by means well known to the art.

Some examples of compositions in accordance with the invention will now be given:

Example I

Preliminarily, commercial sodium calcium lignosulfonate obtained by the well-known Howard process was reacted with various alkyl ammonium compounds by the following general procedure:

The lignosulfonate was dissolved in 3 liters of water, heated to 180° F., the pH adjusted by the addition of the sulfuric acid, the alkyl ammonium salt brought to 180 ° F., and then added to the aqueous solution of the lignosulfonate. Flocculation occurred immediately in all cases, and after standing 15 minutes, the solution was filtered, and the precipitate was dried for 16 hours at 212 ° F. and ground to a fine powder in a laboratory hammer mill. The following table shows the weight of sodium calcium lignosulfonate used per 3 liters of water, as well as the weight and description of the alkyl ammonium compound; and the pH to which the lignosulfonate solution was adjusted prior to the addition of the alkyl ammonium compound.

| Sample No. | Grams lignosul. | Grams ammonium compound | pH | Description of alkyl ammonium compound |
|---|---|---|---|---|
| 1 | 300 | 300 | 3.5 | Stearyl amine. |
| 2 | 250 | 375 | 3 | Distearyl amine. |
| 3 | 200 | 400 | 3 | Stearyl trimethyl ammonium chloride. |
| 4 | 200 | 200 | 3 | Di(hydrogentated tallow) dimethyl ammonium chloride. |
| 5 | 200 | 300 | 3 | Tri(hydrogenated tallow) methyl ammonium chloride. |
| 6 | 300 | 300 | 3 | Hexadecyl dimethyl amine. |
| 7 | 250 | 200 | 7.5 | Tallow 1,3 propylene diamine plus 60 g. glacial acetic acid. |

Compositions in accordance with the invention were then prepared by mulling a commercial silica sand known as Wedron C–10, having a grain fineness number of 125, with a selected sample of long-chain alkyl ammonium lignosulfonate (used as obtained, as powders), and with the selected organic liquid, for 20 minutes in a conventional foundry muller. Green compressive strengths were determined on 2-inch cores; and one-inch cores were baked one hour at 450° F., allowed to cool to room temperature, and the baked core strength determined. Results follow:

| | Test No. | | | | | | | | |
|---|---|---|---|---|---|---|---|---|---|
| | A | B | C | D | E | F | G | H | I |
| | Sample No. | | | | | | | | |
| | 1 | 1 | 2 | 3 | 4 | 4 | 5 | 6 | 7 |
| Sample (grams) | 100 | 100 | 100 | 100 | 100 | 100 | 100 | 100 | 100 |
| n-Octyl alcohol | | 10 | | | | 10 | | | |
| Nonyl Phenol, gm | 15 | | 10 | 20 | 10 | | 20 | 20 | 20 |
| Sand, gm | 1,880 | 1,880 | 1,880 | 1,880 | 1,880 | 1,880 | 1,880 | 1,880 | 1,880 |
| Green compression strength, p.s.i | 10.2 | 9.2 | 10.0 | 7.0 | 8.6 | 9.0 | 7.5 | 8.1 | 8.2 |
| Baked core strength, p.s.i | 425 | 375 | 367 | 249 | 255 | 325 | 265 | 617 | 517 |

It will be seen, particularly from the test results just given that the invention accomplishes its objects. In the foregoing tabulation of test results, relatively small amounts of the various alkyl ammonium lignosulfonates incorporated in the inventive compositions give excellent green compression strengths, and they also give baked core strengths quite adequate for good cores. Thus, our inventive compositions are characterized by a double utility as already explained.

It will be apparent that while we have described our invention with the aid of numerous specific examples, and have disclosed exemplary proportions, quantities, procedures, and the like, our invention is a broad one, and numerous variations in detail, such as choice of ingredients, proportions, processing conditions, and the like may be made without departing from the spirit and scope of the invention, as delineated by the claims which follow.

Having described our invention, we claim:

1. A molding and core sand composition, comprising as essential constituents sand, from 2 parts to 10 parts by weight per 100 parts of said sand of an alkyl ammonium lignosulfonate, said alkyl having from 12 to 22 carbon atoms in a straight chain, together with from 0 to 4 parts of organophilic montmorillonite and organophilic attapulgite and mixtures thereof for each part of alkyl ammonium lignosulfonate, and an organic liquid of a kind and in an amount sufficient to impart to said molding and core sand composition a green compressive strength of at least two pounds per square inch.

2. A composition in accordance with claim 1 in which said alkyl ammonium lignosulfonate is dimethyl dioctadecyl ammonium lignosulfonate.

3. A composition in accordance with claim 1 in which said liquid is nonyl phenol.

4. A composition in accordance with claim 2 in which said liquid is nonyl phenol.

5. A composition in accordance with claim 1 in which the said organic liquid is a phosphate ester of an ethoxylated nonyl phenol.

6. A composition in accordance with claim 1 in which the said organic liquid is selected from the group consisting of nonyl phenol and paraffin oil and mixtures thereof.

7. A composition in accordance with claim 1 in which said alkyl ammonium lignosulfonate is dimethyl dihydrogenated-tallow ammonium lignosulfonate.

8. A composition in accordance with claim 7 in which the said organic liquid is selected from the group consisting of nonyl phenol and paraffin oil and mixtures thereof.

9. A composition in accordance with claim 7 in which the said organic liquid is a phosphate ester of an ethoxylated nonyl phenol.

References Cited

UNITED STATES PATENTS

| 1,467,321 | 9/1923 | Hurt | 106—38.2 |
| 2,594,302 | 4/1952 | Ehrensperger | 260—124 |
| 2,850,492 | 9/1958 | Erskine et al. | 260—124 |
| 3,210,203 | 10/1965 | Cowan et al. | 106—38.35 |
| 3,330,674 | 7/1967 | Santmyer | 106—38.6 XR |

FOREIGN PATENTS 868,003   5/1961   Great Britain.

JAMES A. SEIDLECK, *Primary Examiner.*

L. B. HAYES, *Assistant Examiner.*